United States Patent [19]

Petersson

[11] Patent Number: 4,830,696

[45] Date of Patent: May 16, 1989

[54] METHOD OF MANUFACTURING HOLLOW FURNITURE PARTS, SUCH AS TABLE LEGS, AS WELL AS APPARATUS FOR CARRYING OUT SAID METHOD

[75] Inventor: Olle Petersson, Älmhult, Sweden

[73] Assignee: Inter-Ikea A/S, Denmark

[21] Appl. No.: 200,071

[22] Filed: May 27, 1988

[30] Foreign Application Priority Data

May 27, 1987 [DK] Denmark ............................ 2729/87

[51] Int. Cl.[4] ........................ B32B 31/16; B32B 31/18

[52] U.S. Cl. .................................... 156/154; 144/348; 144/350; 156/250; 156/292; 156/324; 156/543; 156/544; 156/553; 156/555

[58] Field of Search ................ 144/348, 350; 156/154, 156/250, 292, 324, 543, 544, 553, 555

[56] References Cited

U.S. PATENT DOCUMENTS

| | | | |
|---|---|---|---|
| 1,314,007 | 8/1919 | McGruer | 144/350 |
| 2,348,291 | 5/1944 | Goldman | 144/348 X |
| 2,352,533 | 6/1944 | Goldman | 144/348 X |
| 3,269,440 | 8/1966 | Duncan et al. | 144/350 |
| 3,493,021 | 2/1970 | Champigny | 144/348 |
| 4,638,843 | 1/1987 | Sinko | 144/350 |

FOREIGN PATENT DOCUMENTS 2092948 8/1982 United Kingdom .

*Primary Examiner*—Robert A. Dawson

[57] ABSTRACT

A method of manufacturing hollow furniture parts, such as table legs comprises conveying wooden laminae to a work station to form the furniture parts. The number of wooden laminae conveyed to a modeling unit provided with polygonally, preferably squarely arranged guide surfaces corresponds to the number of said guide surfaces. The wooden laminae slide across the guide surfaces while abutting said surfaces. The longitudinal edges of the individual lamina are undercut so that the laminae form a prismatic, hollow tube subsequent to being assembled. The side surfaces of said tube are mitred along the longitudinal edges of the tube, and the wooden laminae are glued together in pairs by means of a fast-drying glue applied shortly before the laminae reach the modeling unit. Support and/or end blocks are then optionally inserted in and glued to the inside of the prismatic tube. Finally the tube is cut into small pieces corresponding to the furniture parts. This method enables the manufacture of furniture parts with prismatic shape in a simple manner while avoiding such steps in the process resulting in considerable inner stresses in the wood.

12 Claims, 3 Drawing Sheets

Fig. 5
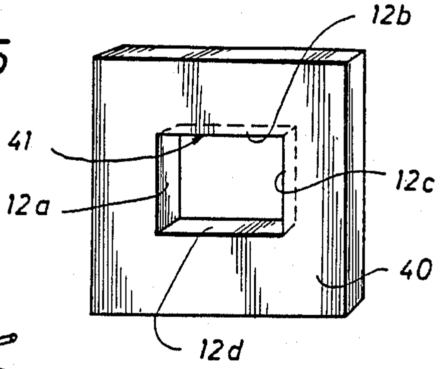
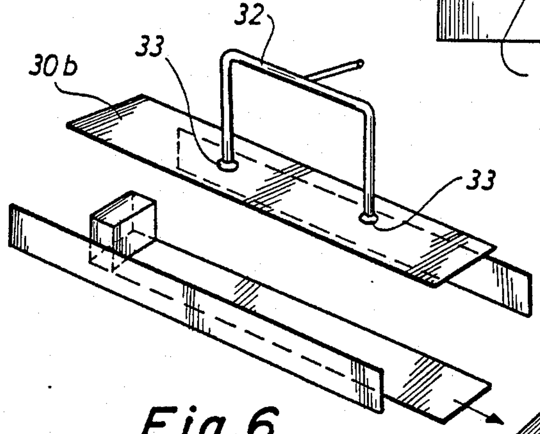
Fig. 6
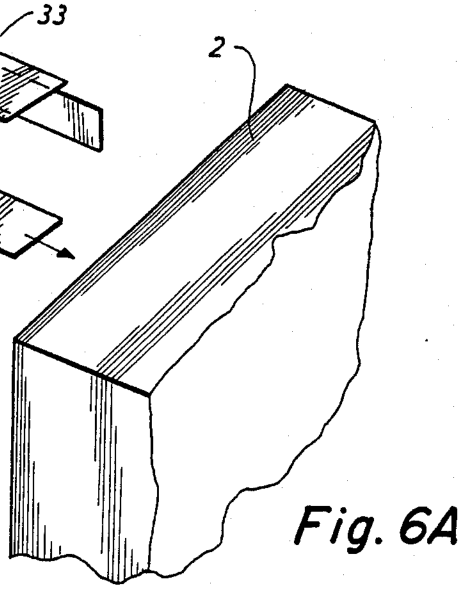
Fig. 6A
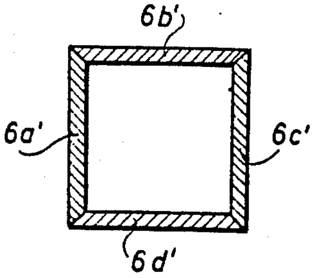
Fig. 7

METHOD OF MANUFACTURING HOLLOW FURNITURE PARTS, SUCH AS TABLE LEGS, AS WELL AS APPARATUS FOR CARRYING OUT SAID METHOD

FIELD OF THE INVENTION

The invention relates to a method of manufacturing hollow furniture parts, such as table legs, said method being optionally continuous, and comprising conveying wooden laminae to a work station to form the furniture parts.

BACKGROUND ART

It has been known for a long time to manufacture tubes of wooden veneer with circular cross-section by helically wrapping strips of veneer. This method is, however, unsuitable for the manufacture of a large number of pieces of furniture, where the furniture parts are to be prismatic or possibly rectangular. Moreover, there is a risk of considerable stresses to be developed in the wood due to the strong bending the wood is subjected to.

SUMMARY OF THE INVENTION

The object of the invention is to provide a method enabling the manufacture of furniture parts with prismatic shape in a simple manner while avoiding such steps in the process resulting in considerable inner stresses in the wood.

The inventive method is characterized by the number of wooden laminae conveyed to a modeling unit provided with polygonally, preferably squarely arranged guide surfaces corresponding to the number of said guide surfaces, the wooden laminae sliding across the guide surfaces while abutting said surfaces, and the longitudinal edges of the individual lamina being undercut so that the laminae form a prismatic, hollow tube subsequent to being assembled, the side surfaces of said tube being mitred along the longitudinal edges of the tube, and the wooden laminae being glued together in pairs by means of a fast-drying glue applied shortly before the laminae reach the modeling unit, and support and/or end blocks being optionally inserted in and glued to the inside of the prismatic tube, whereupon said tube is cut into small pieces corresponding to the furniture parts. This results in a simple method of manufacturing the desired prismatic furniture parts without running the risk of serious inner stresses in the wood, as the wooden laminae are conveyed to the modeling unit substantially without being deformed. At the modeling unit the wooden laminae are glued together in pairs at the undercut longitudinal edges so that a prismatic tube is formed. The glue is of the fast-drying type to ensure that the tube does not collapse right after the modeling unit. The support and/or end blocks are inserted to reinforce the prismatic tube. Finally the prismatic tube is cut into small pieces corresponding to the furniture parts. The end blocks close the openings at the end of the furniture parts so that the hollowness of the furniture parts is not noticed.

In an especially suitable embodiment of the invention the laminae used are wooden veneers or fiberboards.

The inventive end blocks used are provided with recesses for fastening the furniture part to other furniture parts, thus facilitating the attachment of said furniture part to another part of the furniture.

The inventive support block is arranged in the middle of the inside of the furniture part, such as a table leg, giving the furniture part mechanical strength despite it being hollow and of comparatively light weight.

According to the invention the outside of the prismatic tube is sanded down along the mitred edges subsequent to the assembly of the wooden laminae but before the cutting into furniture parts, thus ensuring a finished, consumer-friendly surface of the furniture part.

The inventive guide surfaces of the modeling unit are arranged such that they form the sides of a triangle, preferably an equilateral triangle, resulting in a triangular cross-section of the furniture part. A table leg of such a cross-section is especially suitable for a low coffee table.

Furthermore, the inventive support and/or end blocks have been fastened to one of the wooden laminae before it reaches the modeling unit. As a result the manufacture of the prismatic tube and thus the furniture part is especially simple.

According to the invention long pieces of wooden lamina are used instead of an endless lamina, the length of said pieces corresponding to once, twice or several times the length of a furniture part, such as the length of a table leg. As a result the risk of undesired stresses in the prismatic tube is very low, as it is almost unnecessary to bend the wooden laminae during their way to the modeling unit.

The invention also relates to an apparatus for carrying out the inventive method, said apparatus being characterized in that it comprises a number of holders for the wooden laminae to form a prismatic tube, a modeling unit having guide bodies provided with corresponding guide surfaces polygonally arranged along the sides of the modeling unit for assembling the wooden laminae and conveying the resulting prismatic tube, a number of glue application means for applying glue to the longitudinal edges of the wooden laminae, and optionally a sanding means, and a cutting means for cutting off furniture parts of a desired length from the prismatic tube. This ensures an especially simple and inexpensive manufacture of the inventive furniture part.

In one embodiment of the inventive apparatus the guide bodies are arranged in such a way that their guide surfaces form a square aperture of a size corresponding to the cross-section of the furniture part, such as a table leg. This renders the apparatus especially suitable for the manufacture of all types of table legs.

According to the invention the guide bodies are slightly staggered with respect to each other seen in the forward direction of the prismatic tube, resulting in more space for the shafts of the guide bodies.

Finally, the inventive guide bodies are rigid and form an integral unit by constituting a large block with an aperture where the prismatic tube is formed. This is an especially suitable embodiment when the wooden laminae are to be conveyed at a low velocity. The guide surfaces are stationary, since there is no risk of extensive friction between the guide surfaces of the modeling unit and the wooden laminae.

BRIEF DESCRIPTION OF THE DRAWINGS

The invention is described in greater detail below and with reference to the accompanying drawings, in which FIG. 5 illustrates a modeling unit in form of a solid block with an aperture, where the defining surfaces of the aperture form the guide surfaces for the wooden laminae, FIGS. 6 and 6A illustrate a table leg during its manufacture, where pieces of wooden lamina with a predetermined length are used instead of an endless lamina, and FIG. 7 is a cross-sectional view of a square table leg with mitred corners.

DESCRIPTION OF THE PREFERRED EMBODIMENTS

Figure 1:
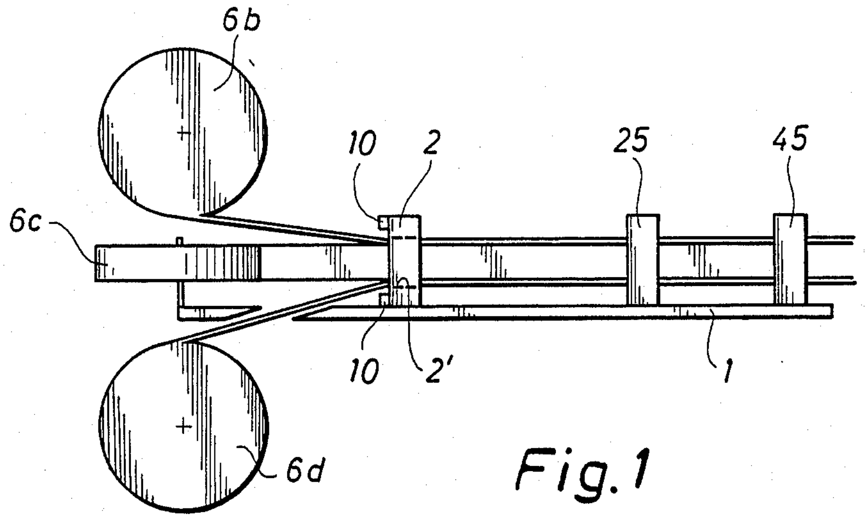
FIG. 1 is a diagrammatic, lateral view of an apparatus for carrying out the inventive method.
Figure 2:
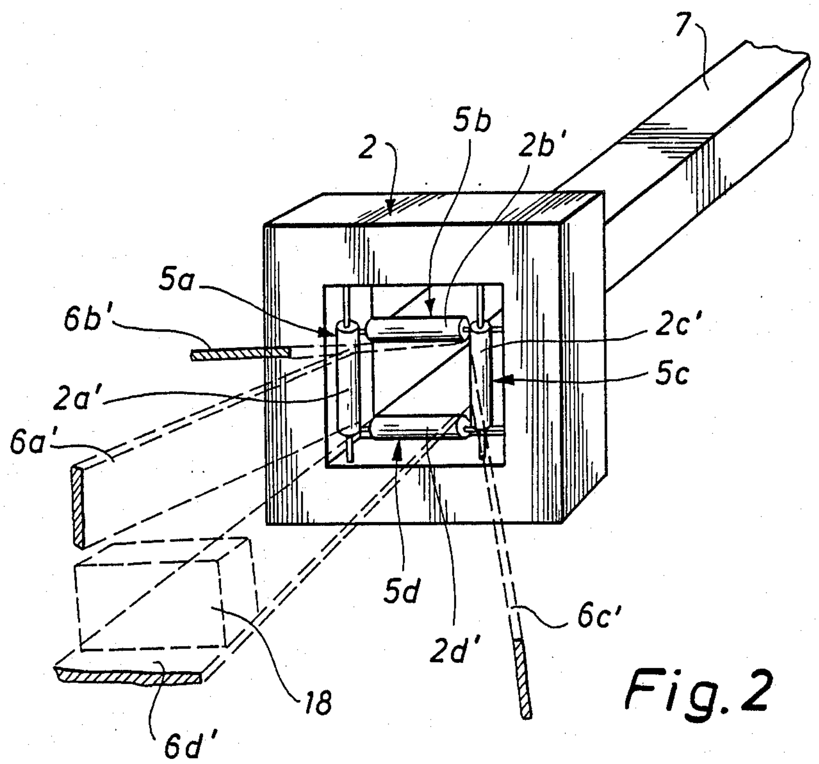
FIG. 2 illustrates an embodiment of the modeling unit of the apparatus, where the guide bodies with corresponding guide surfaces form substantially a square.

The apparatus of FIG. 1 comprises a bottom plate 1 above which there is mounted a modeling unit 2 carrying a number of guide bodies with corresponding guide surfaces 2'. FIG. 2 illustrates how the guide bodies comprise the rollers *5a, 5b, 5c, 5d* being of circular cross-section. In this case the guide surfaces are the curved surfaces *2a', 2b', 2c', 2d'* of the rollers *5a, 5b, 5c, 5d.* In FIG. 2 the guide bodies are arranged such that they substantially form the sides of a square. On the other hand, the use of more guide bodies than four, i.e. a guide body for each side of a polygon, is also possible. The guide bodies can be slightly staggered with respect to each other, seen in the longitudinal direction of the apparatus, so that the shafts of the rollers do not impede each other.

The apparatus of FIG. 1 comprises furthermore four holders *6a, 6b, 6c,* for rolls of bands of wooden lamina (actually fiberboard) (the fourth holder is hidden behind the holder *6c* and thus not provided with a reference numeral). The rolls of wooden lamina have cores (not shown) with large diameters to ensure that the wooden laminae reeled off the rolls have a comparatively slight curvature when they are on the rolls. Instead of said rolls of wooden lamina long pieces of wooden lamina (bands) of a predetermined length, see below, can also be used. On the right-hand side of FIG. 1 the apparatus is provided with a cutting means 45 for cutting off finished furniture parts, such as table legs, from a prismatic tube 7 formed by wooden laminae *6a', 6b', 6c', 6d'* at the modeling unit 2.

The apparatus of FIG. 1 is furthermore provided with several glue application means 10 at the corners of the square formed by the guide bodies *5a, 5b, 5c, 5d.* When the guide bodies form an n-sided polygon instead of a rectangle, the apparatus is provided with n glue application nozzles each at a corner of the polygon, and with n guide bodies.

Figure 3:
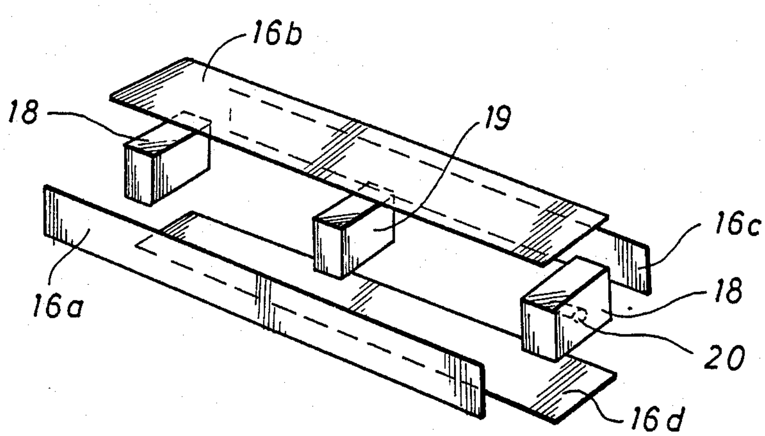
FIG. 3 is a perspective view of a table leg manufactured according to the inventive method, the parts of said table leg being separate.

FIG. 3 illustrates a table leg manufactured by means of the inventive method, the parts of said table leg being separate. There are four pieces of wooden lamina *16a, 16b, 16c, 16d,* each of their ends being provided with end blocks 18. Inside the table leg a support block 19 is inserted, preferably in the middle of the leg. The end blocks are optionally provided with recesses 20 (depicted with a dotted line) to ensure an easy mounting of the table leg to a table leaf.

Figure 4:
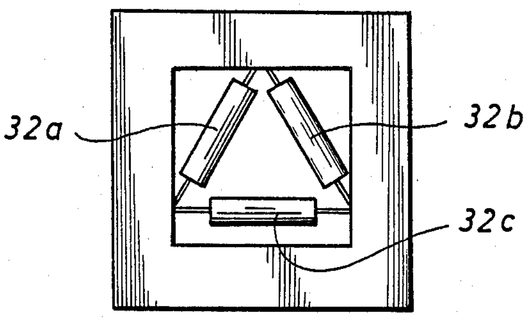
FIG. 4 is a perspective view of a modeling unit, where the three guide bodies are arranged to form substantially an equilateral triangle.

Instead of a modeling unit with four guide surfaces (one on each rotating guide body) the modeling unit can comprise only three guide surfaces *32a, 32b, 32c,* cf. FIG. 4, in which there are only three rotating guide bodies. The latter are arranged such that they substantially form the sides of a triangle, preferably an equilateral triangle.

The modeling unit can also comprise a solid plate 40 with an aperture 41 in its middle, said aperture being provided with a number of guide surfaces *12a, 12b, 12c, 12d.* Such a modeling unit is used when the friction between the conveyed wooden laminae and the guide surfaces is negligible during conveyance.

The inventive method is carried out on an inventive apparatus in the following way:

The rolls of wooden lamina are placed in their respective holders *6a, 6b, 6c, 6d,* whereupon the wooden laminae *6a', 6b', 6c', 6d'* are pulled or pushed through the modeling unit 2, said wooden laminae abutting the guide surfaces *2a', 2b', 2c', 2d'* of the guide bodies *5a, 5b, 5c, 5d,* cf. FIG. 1. The individual wooden lamina is mitred along its longitudinal edges, i.e. it is undercut, so that it forms an even joint with its neighbouring laminae. The undercutting on a wooden lamina is performed either in advance or by conveying the wooden lamina through an undercutting means (not shown) of the apparatus, where the undercutting is performed by e.g. planing or sanding. Simultaneous with the laminae *6a', 6b', 6c', 6d'* being conveyed through the modeling unit (and abutting the guide surfaces) glue is applied to the longitudinal edges of the wooden laminae from the application nozzles 10. The nozzles are supplied with glue by means of a common tubing system (not shown). The glue is preferably of the fast-drying type. Subsequent to passing the modeling unit 2 the wooden laminae are glued together to form a prismatic tube 7, cf. FIG. 7. The prismatic tube can be provided with support and/or end blocks 18, 19, cf. FIGS. 2 and 3. The blocks are in advance attached to the wooden lamina *2d'* on the side facing the inside of the prismatic tube 7. The blocks are usually of such a cross-section that they fill out the entire cross-section of the prismatic tube 7. Subsequent to the wooden laminae having passed the modeling unit and the glue having dried the prismatic tube is cut into small pieces corresponding to the individual furniture parts, typically table legs. The cutting is performed by the cutting means 45.

The wooden laminae used are e.g. wooden veneer or fiberboard. Optionally the outside of the prismatic tube 7 is sanded down along the mitred edges by a sanding means 25, diagrammatically shown in FIG. 1. The sanding occurs after the wooden laminae have been assembled but before the cutting into suitable parts.

If it is desired that the prismatic tube 7 has the cross-section of an equilateral triangle instead of a square, the wooden laminae pass through the modeling unit of FIG. 4. The longitudinal edges of each lamina are in this case undercut by 30°. The longitudinal edges of the wooden laminae of FIG. 2 are undercut by 45°.

When the wooden laminae are very smooth the modeling unit 2 of FIG. 5 is most suitable.

Instead of an endless lamina (rolled-up wooden lamina) comparatively long pieces of wooden lamina can be used for the inventive method. Such pieces can have a length corresponding to twice or several times the length of the furniture part, such as a table leg. In this case the individual piece of wooden lamina *30b* is conveyed to the modeling unit 2 by means of a holding means 32 operating with vacuum, the outer ends of said holding means being provided with suction cups 33 ensuring a secure hold of the piece of wooden lamina 30*b*.

In the present application the term "wooden lamina" refers to lamina band made of wood. The term is, however, to be understood in a much broader sense, since it covers many other materials, such as plastics or presswood.

The invention may be varied in many ways without thus deviating from the scope of the invention.

I claim:

1. A method of manufacturing hollow furniture parts, such as table legs, said method being optionally continuous, and comprising conveying wooden laminae to a work station to form the furniture parts, wherein the number of wooden laminae (*6a', 6b', 6c', 6d'*) conveyed to a modeling unit provided with polygonally, preferably squarely arranged guide surfaces corresponds to the number of said guide surfaces, the wooden laminae sliding across the guide surfaces while abutting said surfaces, and the longitudinal edges of the individual lamina being undercut so that the laminae form a prismatic, hollow tube (7) subsequent to being assembled, the side surfaces of said tube being mitred along the longitudinal edges of the tube, and the wooden laminae (*6a'–6d'*) being glued together in pairs by means of a fast-drying glue applied shortly before the laminae reach the modeling unit (2), and support and/or end blocks (18, 19) being optionally inserted in and glued to the inside of the prismatic tube (7), whereupon said tube is cut into small pieces corresponding to the furniture parts (16).

2. A method as in claim 1, wherein the laminae (*6a', 6b', 6c', 6d'*) used are wooden veneers or fiberboards.

3. A method as in claim 1, wherein the end blocks (18) used are provided with recesses (20) for fastening the furniture part to other furniture parts.

4. A method as in claim 1, wherein the support block (19) is arranged in the middle of the inside of the furniture part, such as a table leg.

5. A method as in claim 1, wherein subsequent to the assembly of the wooden laminae (*6a', 6b', 6c', 6d'*) but before the cutting into furniture parts the outside of the prismatic tube (7) is sanded down (at 25) along the mitred edges.

6. A method as in claim 1, wherein the guide surfaces (*32a, 32b, 32c*) of the modeling unit (2) are arranged such that they form the sides of a triangle, preferably an equilateral triangle.

7. A method as in 1, wherein the support and/or end blocks (18, 19) have been previously fastened to one of the wooden laminae (*6d'*).

8. A method as in claim 1, wherein long pieces of wooden lamina are used instead of an endless lamina, the length of said pieces corresponding to once, twice or several times the length of a furniture part, such as the length of a table leg.

9. An apparatus for carrying out the method according to claim 1, wherein said apparatus comprises a number of holders (*6a, 6b, 6c, 6d*) for the wooden laminae (*6a', 6b', 6c', 6d'*) to form a prismatic tube (7), a modeling unit (2) having guide bodies (*5a, 5b, 5c, 5d*) provided with corresponding guide surfaces (*2a', 2b', 2c', 2d'*) polygonally arranged along the sides of the modeling unit (2) for assembling the wooden laminae and conveying the resulting prismatic tube (7), a number of glue application means (10) for applying glue to the longitudinal edges of the wooden laminae (*6a', 6b', 6c', 6d'*), and optionally a sanding means (25) and a cutting means (45) for cutting off furniture parts of a desired length from the prismatic tube (7).

10. An apparatus as in claim 9, wherein the guide bodies (*5a, 5b, 5c, 5d*) are arranged in such a way that their guide surfaces (*2a', 2b', 2c', 2d'*) form a square aperture of a size corresponding to the cross-section of the furniture part, such as a table leg.

11. An apparatus as in claim 9, wherein the guide bodies (*5a, 5b, 5c, 5d*) are slightly staggered with respect to each other seen in the forward direction of the prismatic tube (7).

12. An apparatus as in claim 9, wherein the guide bodies (*5a, 5b, 5c, 5d*) are rigid and form an integral unit by constituting a large block (40) with an aperture (41) where the prismatic tube (7) is formed.

* * * * *